(12) United States Patent
Baluja et al.

(10) Patent No.: US 10,380,640 B2
(45) Date of Patent: *Aug. 13, 2019

(54) AD RENDERING PARAMETERS, SUCH AS SIZE, STYLE, AND/OR LAYOUT, OF ONLINE ADS

(71) Applicant: Google Inc., Mountain View, CA (US)

(72) Inventors: Shumeet Baluja, Leesburg, VA (US); Vibhu Mittal, Bengaluru (IN); Mehran Sahami, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 1535 days.

This patent is subject to a terminal disclaimer.

(21) Appl. No.: 14/160,664

(22) Filed: Jan. 22, 2014

(65) Prior Publication Data

US 2014/0136304 A1     May 15, 2014

Related U.S. Application Data

(63) Continuation of application No. 11/026,329, filed on Dec. 30, 2004, now Pat. No. 8,666,820.

(51) Int. Cl.
*G06Q 30/00* (2012.01)
*G06Q 30/02* (2012.01)
*G06F 17/21* (2006.01)

(52) U.S. Cl.
CPC ....... *G06Q 30/0263* (2013.01); *G06F 17/211* (2013.01); *G06Q 30/02* (2013.01);
(Continued)

(58) Field of Classification Search
CPC .................. G06Q 30/0277; G06F 17/0211
(Continued)

(56) References Cited

U.S. PATENT DOCUMENTS 5,724,521 A    3/1998  Dedrick
5,740,549 A    4/1998  Reilly
(Continued)

FOREIGN PATENT DOCUMENTS

WO    WO1997021183 A1    6/1997

OTHER PUBLICATIONS

AdForce, Inc., A Complete Guide to AdForce, Version 2.6, 1998.
(Continued)

*Primary Examiner* — Michael Bekerman
(74) *Attorney, Agent, or Firm* — Foley & Lardner LLP

(57) ABSTRACT

Ad rendering parameters for a set of two or more ads may be determined by (a) accepting, for a set of two or more ads, ad information including at least one ad feature having a value that depends on ad rendering parameters, and (b) determining ad rendering parameters for at least one ad from the set of two or more ads using the accepted ad information. Ad rendering parameters may be determined using accepted ad rendering constraints. The ad rendering constraints may include space available and/or a maximum number of ads permitted to be rendered. The act of determining ad rendering parameters may include maximizing a value associated with serving at least one ad from the set of two or more ads with ad rendering parameters subject to the ad rendering constraints. The ad rendering parameters may include sizes of the served ads, and/or a layout of the served ads.

15 Claims, 7 Drawing Sheets

(52) U.S. Cl.
CPC ..... *G06Q 30/0255* (2013.01); *G06Q 30/0261* (2013.01); *G06Q 30/0269* (2013.01); *G06Q 30/0277* (2013.01)

(58) Field of Classification Search
USPC ........................................ 705/14.73; 715/200
See application file for complete search history.

(56) References Cited

U.S. PATENT DOCUMENTS

| | | | |
|---|---|---|---|
| 5,848,397 | A | 12/1998 | Marsh |
| 5,948,061 | A | 9/1999 | Merriman |
| 6,026,368 | A | 2/2000 | Brown |
| 6,044,376 | A | 3/2000 | Kurtzman |
| 6,078,914 | A | 6/2000 | Redfern |
| 6,144,944 | A | 11/2000 | Kurtzman |
| 6,167,382 | A | 12/2000 | Sparks |
| 6,173,286 | B1 * | 1/2001 | Guttman ............... G06N 3/126 707/803 |
| 6,269,361 | B1 | 7/2001 | Davis |
| 6,311,185 | B1 | 10/2001 | Markowitz |
| 6,401,075 | B1 | 6/2002 | Mason |
| 6,657,647 | B1 | 12/2003 | Bright |
| 6,985,882 | B1 | 1/2006 | Del |
| 7,039,599 | B2 | 5/2006 | Merriman |
| 7,136,875 | B2 | 11/2006 | Anderson |
| 7,346,606 | B2 | 3/2008 | Bharat |
| 2004/0093327 | A1 * | 5/2004 | Anderson ............... G06Q 30/02 |
| 2005/0144069 | A1 | 6/2005 | Wiseman |
| 2005/0289005 | A1 | 12/2005 | Ferber |
| 2006/0089880 | A1 | 4/2006 | Merriman |
| 2006/0111970 | A1 | 5/2006 | Hill |
| 2006/0111971 | A1 | 5/2006 | Salesin |

OTHER PUBLICATIONS

AdForce, Inc. S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www.Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www.Archive.org, archived on Jan. 30, 1998.
Zeff, R. et al., Advertising on the Internet, 2nd Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Pat. No. 7,204,025 B2, Control No. 95/001,073.
Request for Reexamination of U.S. Pat. No. 6,446,045 B1, Control No. 95/001,061.
Request for Reexamination of U.S. Pat. No. 7,249,059 B2, Control No. 95/001,069.
Request for Reexamination of U.S. Pat. No. 6,829,587 B2, Control No. 95/001,068.

* cited by examiner

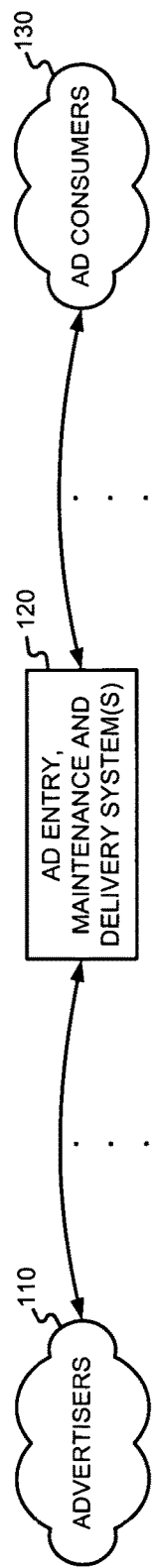
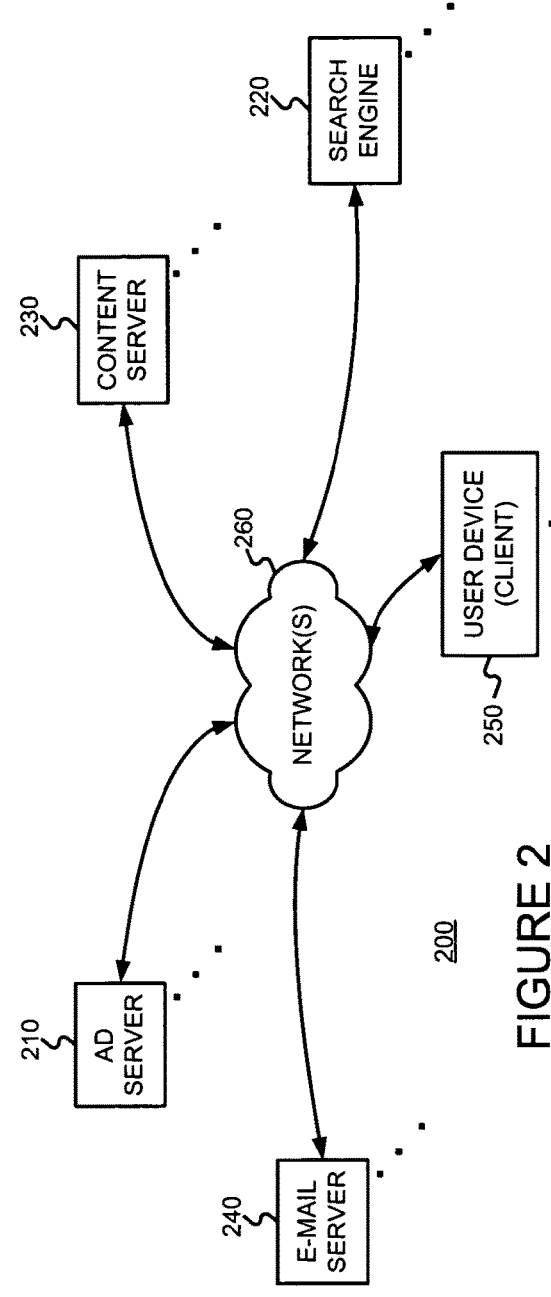

AD RENDERING PARAMETERS, SUCH AS SIZE, STYLE, AND/OR LAYOUT, OF ONLINE ADS

CROSS-REFERENCE TO RELATED APPLICATIONS

This is a continuation of U.S. application Ser. No. 11/026,329 filed Dec. 30, 2004. All subject matter set forth in the above referenced application is hereby incorporated by reference into the present application as if fully set forth herein.

§ 1. BACKGROUND OF THE INVENTION

§ 1.1 Field of the Invention

The present invention concerns online advertising. In particular, the present invention concerns improving the size and/or layout of online ads.

§ 1.2 Background Information

Traditional online, tabular yellow page listings have some limitations. For example, since they are all the same size, they can't convey an implicit message to the user about how much money the company can afford to spend on ads and, therefore, how large it may be (larger companies often being thought of as more reliable). Further, some may find them to be difficult to read because of limited typefaces. Furthermore, most have little or no additional information on products carried by the company because of limited sizes.

In view of the foregoing, it would be useful to improve online ads.

§ 2. SUMMARY OF THE INVENTION

Embodiments consistent with the present invention may determine ad rendering parameters for a set of two or more ads by (a) accepting, for a set of two or more ads, ad information, wherein the ad information includes at least one ad feature having a value that depends on ad rendering parameters, and (b) determining ad rendering parameters for at least one ad from the set of two or more ads using the accepted ad information.

At least some embodiment consistent with the present invention may accept ad rendering constraints, wherein the act of determining ad rendering parameters further uses the accepted ad rendering constraints. In at least some such embodiments, the ad rendering constraints may include space available for rendering the ads, a footprint available for rendering the ads, and/or a maximum number of ads permitted to be rendered.

In at least some embodiments consistent with the present invention, the act of determining ad rendering parameters includes maximizing a value associated with serving at least one ad from the set of two or more ads with ad rendering parameters subject to the ad rendering constraints.

In at least some embodiments consistent with the present invention, the ad rendering parameters may include sizes of the served ads, and/or a layout of the served ads

§ 3. BRIEF DESCRIPTION OF THE DRAWINGS

FIG. 1 is a diagram showing parties or entities that can interact with an advertising system.

FIG. 2 is a diagram illustrating an exemplary environment in which, or with which, the present invention may operate.

§ 4. DETAILED DESCRIPTION

Figure 3:
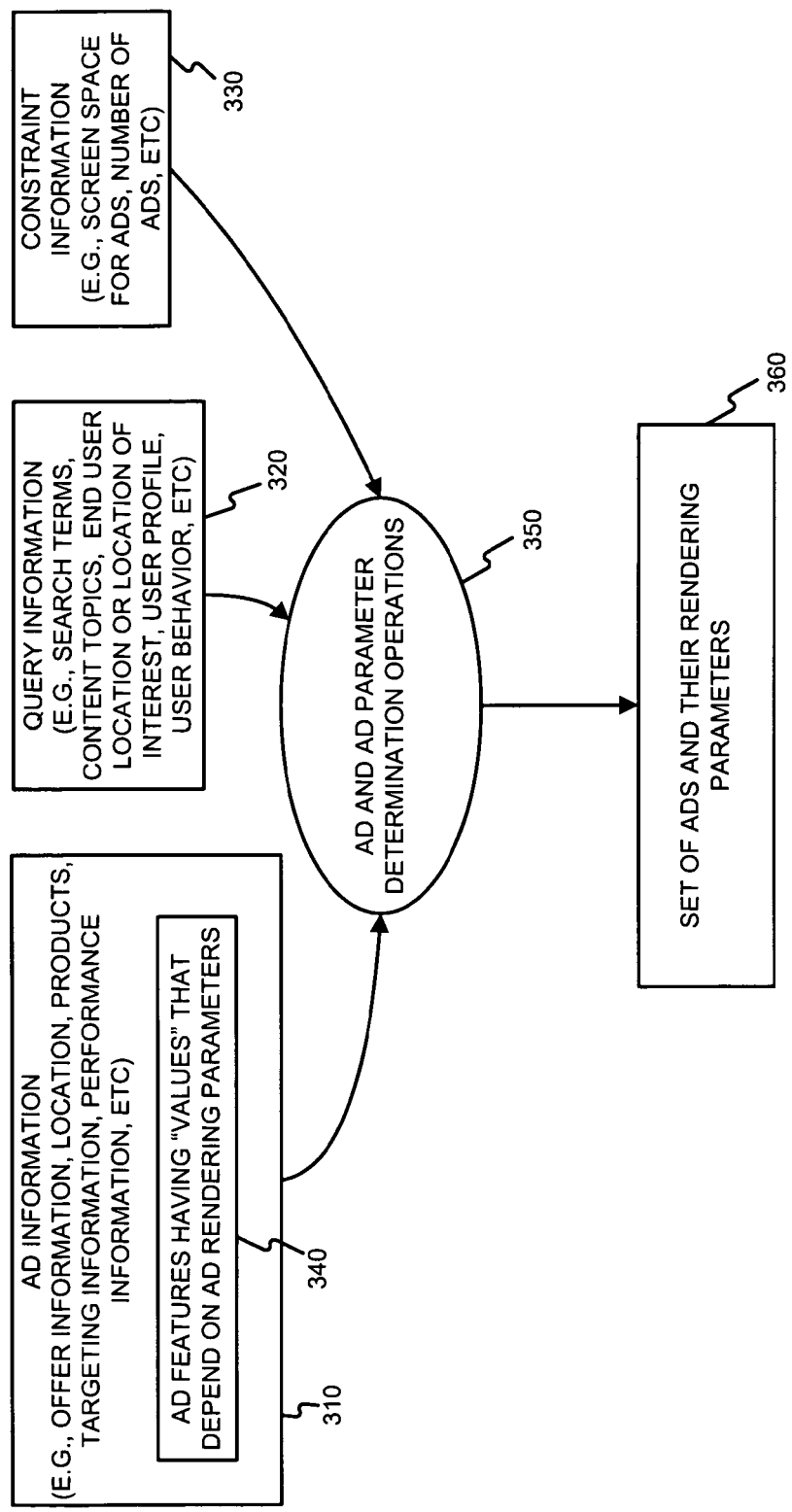
FIG. 3 is a bubble diagram of exemplary operations for determining ad parameters which may be performed in a manner consistent with the present invention, as well as information that may be used and/or generated by such operations.

The present invention may involve novel methods, apparatus, message formats, and/or data structures for improving online advertising. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention to include any patentable subject matter described.

In the following definitions of terms that may be used in the specification are provided in § 4.1. Then, environments in which, or with which, the present invention may operate are described in § 4.2. Exemplary embodiments of the present invention are described in § 4.3. Thereafter, a specific example illustrating the usefulness of one embodiment of the present invention is provided in § 4.4. Finally, some conclusions regarding the present invention are set forth in § 4.5.

§ 4.1 DEFINITIONS

Online ads, such as those used in the exemplary systems described below with reference to FIGS. 1 and 2, or any other system, may have various intrinsic attributes. Such attributes may be specified by an application and/or an advertiser. These attributes are referred to as "ad attributes" below. For example, in the case of a text ad, ad attributes may include a title line, ad text, and an embedded link. In the case of an image ad, ad attributes may include images, executable code, and an embedded link. Depending on the type of online ad, ad attributes may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a page on which the ad was served, a search query or search results associated with the serving of the ad, a user characteristic (e.g., their geolocation, the language used by the user, the type of browser used, previous page views, previous behavior), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, on what basis the ad was determined relevant, etc. Naturally, there are other serving parameters that may be used in the context of the invention.

"Ad rendering parameters" may include the size(s) of one or more ads, the layout of one or more ads, the styles of one or more ads, etc. "Styles" may include font types, font sizes, background color, foreground color, distance and extent of audio/image/animation/video, etc.

Although serving parameters may be extrinsic to ad attributes, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain geolocation, etc. As another example, in some systems, an advertiser may specify that its ad is to be served only if a page or search query includes certain keywords or phrases (referred to generally as "keyword targeting criteria"). As yet another example, in some systems, an advertiser may specify that its ad is to be served only if a document being served includes certain topics or concepts, or falls under a particular cluster or clusters, or some other classification or classifications.

"Ad information" may include any combination of ad attributes, ad serving constraints, information derivable from ad attributes or ad serving constraints (referred to as "ad derived information"), and/or information related to the ad (referred to as "ad related information"), as well as an extension of such information (e.g., information derived from ad related information).

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to, or perceived by, an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as Javascript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer or Netscape), a media player (e.g., an MP3 player, a Realnetworks streaming audio file player, etc.), a viewer (e.g., an Abobe Acrobat pdf reader), etc.

"User information" may include user behavior information and/or user profile information. It may also include a user's geolocation, or an estimation of the user's geolocation.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

§ 4.2 ENVIRONMENTS IN WHICH, OR WITH WHICH, THE PRESENT INVENTION MAY OPERATE

§ 4.2.1 Exemplary Advertising Environment

FIG. 1 is a diagram of an advertising environment 100. The environment 100 may include an ad entry, maintenance and delivery system (simply referred to as an "ad server") 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. An entity other than an ad consumer 130 may initiate a request for ads. Although not shown, other entities may provide usage information (e.g., whether or not a conversion or click-through related to the ad occurred) to the system 120. This usage information may include measured or observed user behavior related to ads that have been served.

The ad server 120 may be similar to the one described in FIG. 2 of U.S. patent application Ser. No. 10/375,900 (incorporated herein by reference), entitled "SERVING ADVERTISEMENTS BASED ON CONTENT," filed on Feb. 26, 2003 and listing Darrell Anderson, Paul Bucheit, Alex Carobus, Claire Cui, Jeffrey A. Dean, Georges R. Hark, Deepak Jindal, and Narayanan Shivakumar as inventors. An advertising program may include information concerning accounts, campaigns, creatives, targeting, etc. The term "account" relates to information for a given advertiser (e.g., a unique e-mail address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line may have one or more ad groups, each containing one or more ads. Each ad group may include targeting information (e.g., a set of keywords, a set of one or more topics, geolocation information, user profile information, etc.), and price information (e.g., maximum cost (cost per click-though, cost per conversion, etc.)). Alternatively, or in addition, each ad group may include an average cost (e.g., average cost per click-through, average cost per conversion, etc.). Therefore, a single maximum cost and/or a single average cost may be associated with one or more keywords, and/or topics. As stated, each ad group may have one or more ads or "creatives" (That is, ad content that is ultimately rendered to an end user.). Each ad may also include a link to a URL (e.g., a landing Web page, such as the home page of an advertiser, or a Web page associated with a particular product or server). Naturally, the ad information may include more or less information, and may be organized in a number of different ways.

FIG. 2 illustrates an exemplary environment 200 in which, or with which, the present invention may be used. A user device (also referred to as a "client" or "client device") 250 may include a browser facility (such as the Explorer browser from Microsoft, the Opera Web Browser from Opera Software of Norway, the Navigator browser from AOL/Time Warner, the Firefox browser from the Mozilla, etc.), an e-mail facility (e.g., Outlook from Microsoft), etc. A search engine 220 may permit user devices 250 to search collections of documents (e.g., Web pages). A content server 210 may permit user devices 250 to access documents. An e-mail server (such as GMail from Google, Hotmail from Microsoft Network, Yahoo Mail, etc.) 240 may be used to provide e-mail functionality to user devices 250. An ad server 210 may be used to serve ads to user devices 250. The ads may be served in association with search results provided by the search engine 220. However, content-relevant ads may be served in association with content provided by the content server 230, and/or e-mail supported by the e-mail server 240 and/or user device e-mail facilities.

As discussed in U.S. patent application Ser. No. 10/375,900 (introduced above), ads may be targeted to documents served by content servers. Thus, one example of an ad consumer 130 is a general content server 230 that receives requests for documents (e.g., articles, discussion threads, music, video, graphics, search results, Web page listings, etc.), and retrieves the requested document in response to, or otherwise services, the request. The content server may submit a request for ads to the ad server 120/210. Such an ad request may include a number of ads desired. The ad request may also include document request information. This information may include the document itself (e.g., page), a category or topic corresponding to the content of the document or the document request (e.g., arts, business, computers, arts-movies, arts-music, etc.), part or all of the document request, content age, content type (e.g., text, graphics, video, audio, mixed media, etc.), geo-location information, document information, etc.

The content server 230 may combine the requested document with one or more of the advertisements provided by the ad server 120/210. This combined information including the document content and advertisement(s) is then forwarded towards the end user device 250 that requested the document, for presentation to the user. Finally, the content server 230 may transmit information about the ads and how, when, and/or where the ads are to be rendered (e.g., position, click-through or not, impression time, impression date, size, conversion or not, etc.) back to the ad server 120/210. Alternatively, or in addition, such information may be provided back to the ad server 120/210 by some other means.

Another example of an ad consumer 130 is the search engine 220. A search engine 220 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 220 may submit a request for ads to the ad server 120/210. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate, and/or as described below, information related to, and/or derived from, the search query), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 220 may combine the search results with one or more of the advertisements provided by the ad server 120/210. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

Finally, the search engine 220 may transmit information about the ad and when, where, and/or how the ad was to be rendered (e.g., position, click-through or not, impression time, impression date, size, conversion or not, etc.) back to the ad server 120/210. As described below, such information may include information for determining on what basis the ad way determined relevant (e.g., strict or relaxed match, or exact, phrase, or broad match, etc.) Alternatively, or in addition, such information may be provided back to the ad server 120/210 by some other means.

Finally, the e-mail server 240 may be thought of, generally, as a content server in which a document served is simply an e-mail. Further, e-mail applications (such as Microsoft Outlook for example) may be used to send and/or receive e-mail. Therefore, an e-mail server 240 or application may be thought of as an ad consumer 130. Thus, e-mails may be thought of as documents, and targeted ads may be served in association with such documents. For example, one or more ads may be served in, under over, or otherwise in association with an e-mail.

Although the foregoing examples described servers as (i) requesting ads, and (ii) combining them with content, one or both of these operations may be performed by a client device (such as an end user computer for example).

§ 4.3 EXEMPLARY EMBODIMENTS

FIG. 3 is a bubble diagram of exemplary operations which may be performed in a manner consistent with the present invention, as well as information that may be used and/or generated by such operations. Ad and ad parameter determination operations 350 may be used to determine rendering parameters (e.g., sizes, layouts, and/or styles) for online ads. The layouts are not limited to a simple linear list of results. For example; layouts of the ads may be more similar to page layouts used in yellow pages.

The ad and ad parameter determination operations 350 may use ad information 310, query information (which may include user information) 320, and/or constraint information 330 to determine a set of ads and their parameters 360. Ad information 310 may include ad features 340 having "values" that depend on ad rendering parameters. Further ad information 310 may include one or more of offer information (e.g., price per impression, selection or conversion, maximum offer per impression, selection or conversion, etc.), location information, product information, targeting information, performance information (e.g., selection rate, conversion rate, etc.), etc. Query information 320 may include one or more of search terms, content topics, end user location or location of interest, user profile, user behavior, etc.

Constraint information 330 may include one or more of screen space (or footprint) for the ads, maximum number of ads permitted, etc.

The constraint information 330 and ad features 340 may be used to determine ads and their rendering parameters. Query information 320 and/or other ad information 310 may also be used in this determination. Thus, the operations 350 can be used to determine a "best" combination of size, style, and/or layout of ads.

§ 4.3.1 Exemplary Methods

Figure 4:
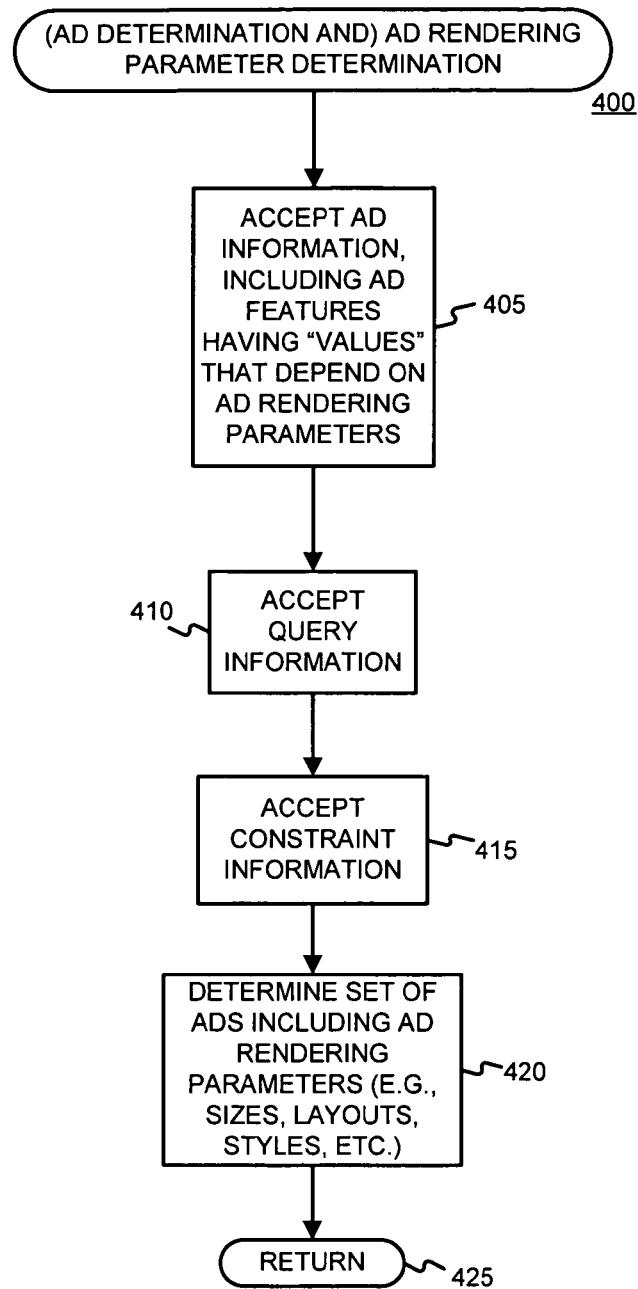
FIG. 4 is a flow diagram of an exemplary method for performing an ad and ad parameter determination operation in a manner consistent with the present invention

FIG. 4 is a flow diagram of an exemplary method 400 that may be used to perform ad rendering parameter (and perhaps ad) determination operations in a manner consistent with the present invention. The method 400 may accept a variety of information to determine an optimized set of rendered ads. In particular, the method 400 may accept ad information (that includes at least one ad feature having a "value" that depends on ad rendering parameters) (Block 405), query information (Block 410), and/or constraint information (Block-415). This obtained information may then be processed to determine an optimized set of ads, including their rendering parameters (Block 420).

Examples of ad information, query information, and constraint information were described earlier in § 4.3. Hence, exemplary feature values will be described here. As described above with reference to block 420, ad rendering parameter determination method 400 may accept ad features having values that depend on the ad rendering parameters. These ad features are used by the method 400 to define a constrained optimization problem where the optimum rendering parameters (e.g., size, style, and/or layout) of ads are determined. (Block 420) Features that may be used to optimize the ad rendering parameters, may include: features having a value that depends on ad rendering parameters (such as selection rate, conversion rate, offer for impression, offer for selection, offer for conversion, ad size (absolute or relative), ad style (absolute or relative), ad layout, etc).

Referring back to block 420, an example of an optimization problem may be defined as maximizing a weighted combination of the feature values for an advertisement relative to the size of the ad. The number of features, constraints, and calculations that may be involved in such a constrained optimization function may be very large and complex. Therefore, standard methods of solving such problems (e.g., linear programming, non-linear programming, integer programming, simulated annealing, etc.) can be used as appropriate (depending on the sort of additional constraints used). A simple constrained optimization problem will be described in § 4.4 below.

§ 4.3.2 Exemplary Apparatus

Figure 5:
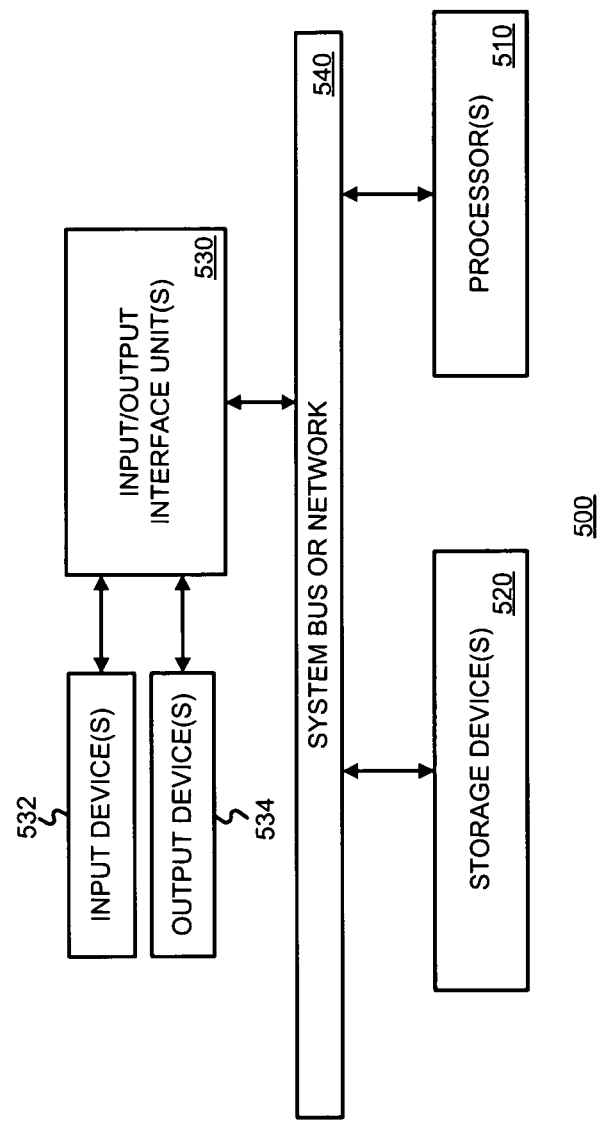
FIG. 5 is a block diagram of apparatus that may be used to perform at least some operations, and store at least some information, consistent with the present invention.

FIG. 5 is high-level block diagram of a machine 500 that may perform one or more of the operations discussed above. The machine 500 basically includes one or more processors 510, one or more input/output interface units 530, one or more storage devices 520, and one or more system buses and/or networks 540 for facilitating the communication of information among the coupled elements. One or more input devices 532 and one or more output devices 534 may be coupled with the one or more input/output interfaces 530.

The one or more processors 510 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. At least a portion of the machine executable instructions may be stored (temporarily or more permanently) on the one or more storage devices 520 and/or may be received from an external source via one or more input interface units 530.

In one embodiment, the machine 500 may be one or more conventional personal computers. In this case, the processing units 510 may be one or more microprocessors. The bus 540 may include a system bus. The storage devices 520 may include system memory, such as read only memory (ROM) and/or random access memory (RAM). The storage devices 520 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 532, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 510 through an appropriate interface 530 coupled to the system bus 540. The output devices 534 may include a monitor or other type of display device, which may also be connected to the system bus 540 via an appropriate interface. In addition to (or instead of) the monitor, the personal computer may include other (peripheral) output devices (not shown), such as speakers and printers for example.

§ 4.3.3 Refinements and Alternatives

Although many of the foregoing discussions and examples concern determining rendering parameters (e.g., styles, sizes, and/or layouts (e.g., yellow page-like layouts)) for ads, there are many other applications in which the principles of the present invention could be applied. For instance, embodiments consistent with the present invention could be used for determining the layout of news stories. For example, the amount of space and size of the font for the news headline could be controlled by a similar method. Also, embodiments consistent with the present invention could be refined to support the creation of dynamic yellow book-like pages that work with concept-targeted ads rather than keyword-targeted ads. For instance, if a user conducts a search on the key-word "plumbers", instead of just providing a list of plumbers, it could also provide a list of hardware stores.

Furthermore, the invention may be able to further refine the optimized ad sizes and layout by using a variety of optimization algorithms (VLSI layout, stochastic search, dynamic programming, etc.) to determine placement alternatives and may further refine the weights used in the optimization over time, using ad selection rate for different media, different locations, and/or different classes of users.

Another refinement can be to provide constraints as to how ads with different sizes and shapes can be mixed with respect to one another, thereby preventing a layout that is jumbled (e.g., due to too many sizes on the layout, ad size set discontinuities, etc.). For instance, once sizes for each ad are determined by the methods discussed earlier, the invention can then quantize the ads as necessary to fit the "closest" available ad size. Such quantization can be incorporated into the original optimization problem through additional constraints.

Computations taking place during the operations of the present invention may be complicated and extensive. However, other common methods for tackling non-linear result sets may be used, such as showing a topographic map.

§ 4.4 EXAMPLE OF OPERATIONS

Figure 6:
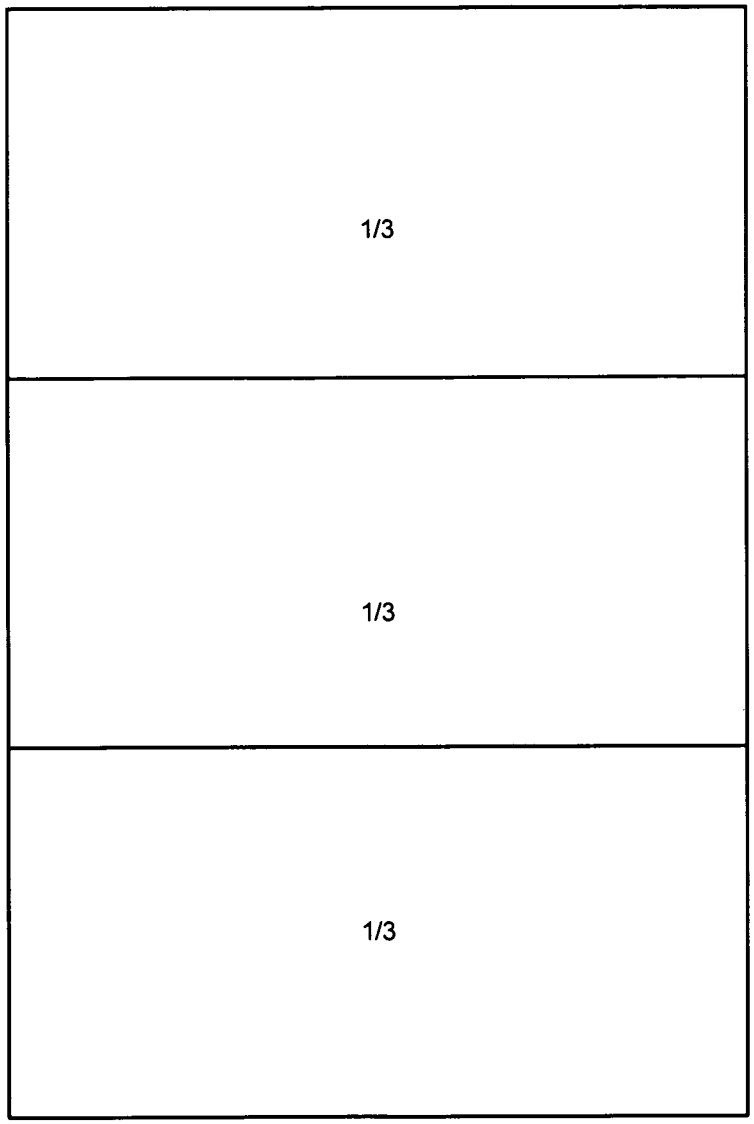
FIGS. 6-8 illustrate exemplary advertisement layout pages that are used to illustrate how an exemplary embodiment consistent with the present invention may be used to improve ad size and/or layout.
Figure 7:
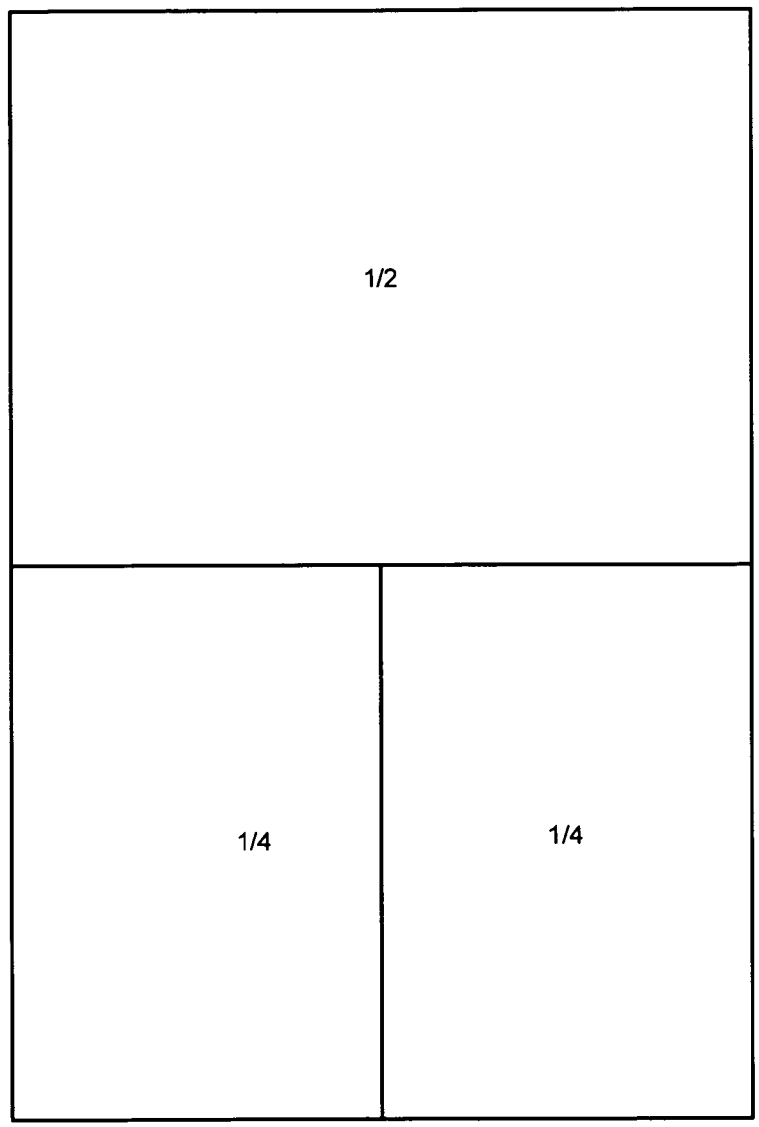
Figure 8:
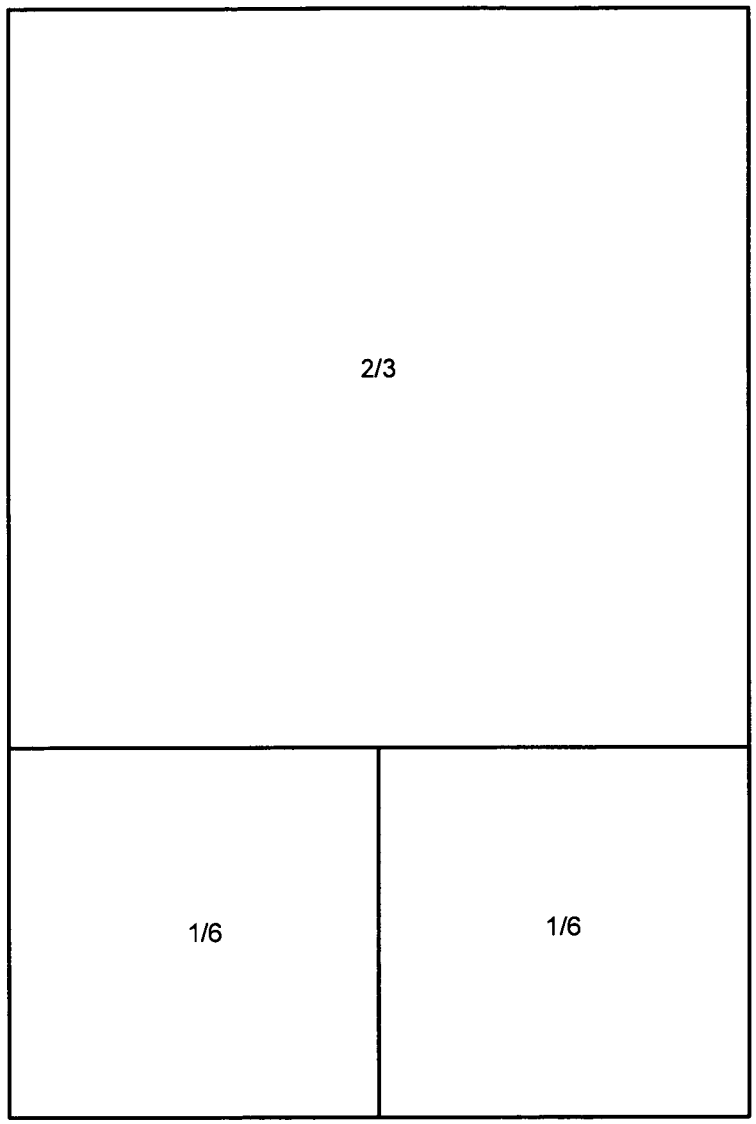

FIGS. 6-8 illustrate exemplary candidate layouts for displaying yellow page-like ads, used to illustrate exemplary operations in an exemplary embodiment of the invention. FIGS. 6-8 serve as layout constraints to an optimization problem since only three (3) ads can be displayed on each layout, and each ad must fit to one of the spaces defined in a layout. In FIG. 6 since the allotted space for ads has been divided evenly into three pieces, each ad will have a size of one third of the total allotted space allowed for ads. In FIG. 7 each ad could be sized to fit in any of the three (3) divided spaces. Hence, one (1) of the ads could have a size of one half, while the other two (2) ads would have a size of one fourth. In FIG. 8, again each ad could be sized to fit in any of three (3) divided spaces. Hence, one of the ads could have a size of two thirds, while the other two (2) ads would have a size of one sixth. Thus, there are three potential layouts for the ads to be displayed on, and one of five possible sizes each ad could have. These possible parameters serve as constraints to the following example.

In the following, a detailed example of the optimization operation that may occur at the ad and ad parameter determination operation will be presented. In particular, the optimization problem concerns maximizing a constrained function of weighted combinations of feature values for an advertisement relative to the size of the ad.

Specifically, consider having a set of advertisers who are targeting the query "leather jacket". Each of these advertisers has some features associated with them. Consider the following advertisers:

Advertiser_1: Macy's
Distance: 0.1
CTR: 0.05*size of ad
Advertiser_2: Nordstrom
Distance: 0.3
CTR: 0.03*size of ad
Advertiser_3: Target
Distance: 0.9
CTR: 0.06*size of ad The feature values from these advertisers are distance and CTR (click-through rate) and are represented by the following:
Feature_val_1=Distance
Feature_val_2=CTR Here, distance refers to the distance from the user to the advertised location and CTR refers to the click-through rate of the ad. No units are shown for values of distance since they serve no significance for this illustration (they could be miles, kilometers, etc). Also note that the click-through rate is a linear function of the size of the ad which is the variable to be optimized.

Now consider the optimization problem of maximizing the function:

$$\sum_{\alpha}\sum_{\lambda}(\text{weight}\_\lambda \times \text{Feature\_val}\_\lambda \times \text{size}\_\alpha) + \sum_{\gamma}(\text{reward}\_\gamma)$$

where $\alpha$ is an index of ads, $\lambda$ is an index of features and $\gamma$ is an index of conditions, subject to the following constraints:

$$\sum_{\alpha}(\text{size}\_\alpha) = 1$$

$$\text{size}\_\alpha \geq \frac{1}{\kappa}, \forall \alpha \in [1, 3]$$

where $\kappa$ is a constant and $\kappa \geq$ (number of ads). In this case, $\kappa=6$ since the smallest size available on the three layouts depicted by FIGS. 6-8 is one sixth.

Also, consider the additional constraints mentioned earlier depicted by FIGS. 6-8. In particular, only three (3) ads can be displayed on each layout, and each ad must fit to one of the divided spaces from a layout. Thus, there are three potential layouts and one of five possible sizes each ad could have.

Note that some implementations could involve a large number of features and constraints in the optimization problem, making it computationally expensive. However, this simple example is useful for purposes of illustration.

In the above optimization problem weight_$\lambda$ denotes the weight of the $\lambda^{th}$ feature of an ad, Feature_val_$\lambda$ denotes the value of the $\lambda^{th}$ feature for the ad, and size_$\alpha$ denotes the size of an ad. Specifically, $\alpha=1$ refers to advertiser_1, $\alpha=2$ refers to advertiser_2, and $\alpha=3$ refers to advertiser_3.

The following exemplary weights are assigned to each feature. Since Feature_val_1 depends on distance, a function that decreases values as the distance between the user and the advertised location increases is used. Hence a possible weight function may be:

$$\text{weight\_1} = \frac{30}{(\text{distance} + 0.5)}.$$

This weight function will be assigned to Feature_val_1 and will be used in this example. The weight given to Feature_val_2 which refers to the click-through weight of an ad will be defined as a constant specifically, weight_2=100.

Furthermore, the reward_$\gamma$ included in the optimization problem denotes a reward given for satisfying condition $\gamma$. The reward values and their respective conditions can be represented by the function_satisfied_$\gamma$ which indicates the degree to which condition $\gamma$ is satisfied.

Specifically, in this example, the rewards are defined as follows:
$\gamma=1$ (refers to advertiser_1)$\Rightarrow$ function_satisfied_1:
If size_1$\geq$0.5, then reward_1=5 else reward_1=0.
$\gamma=2$ (refers to advertiser_2)$\Rightarrow$ function_satisfied_2:
If size_2$\geq$0.25, then reward_2=3 else reward_2=0.
$\gamma=3$ (refers to advertiser_3)$\Rightarrow$ function_satisfied_3:
If size_

$$\text{size\_3} \geq \frac{1}{3},$$

then reward_3=4 else reward_3=0.

The above conditions and results can be thought of as additional constraints of the optimization problem.

Having defined all features, weights, constraints, as well as a function to maximize, the optimization problem can now be solved. Again the goal is to maximize the constrained function:

$$\sum_\alpha \sum_\lambda (\text{weight\_}\lambda \times \text{Feature\_val\_}\lambda \times \text{size\_}\alpha) + \sum_\gamma (\text{reward\_}\gamma).$$

A series of calculations will follow:
$1^{ST}$ Layout (FIG. 6):
For $$\left.\begin{array}{l}\text{size\_1} = \frac{1}{3}\\ \text{size\_2} = \frac{1}{3}\\ \text{size\_3} = \frac{1}{3}\end{array}\right\},$$

entering these values in the optimization function generates:
According to equation $$\sum_\alpha \sum_\lambda (\text{weight\_}\lambda \times \text{Feature\_val\_}\lambda \times \text{size\_}\alpha) + \sum_\gamma (\text{reward\_}\gamma)$$

For $\alpha=1$ (advertiser_1):
For $\lambda=1$ (first feature value), $\gamma=1$ (refers to advertiser_1):

$$(\text{weight\_1} \times \text{Feature\_val\_1} \times \text{size\_1}) + 0 \qquad (1)$$

For $\lambda=2$ (second feature value):

$$(\text{weight\_2} \times \text{Feature\_val\_2} \times \text{size\_1}) \qquad (2)$$

$$(1) + (2) \Rightarrow \left(\left(\frac{30}{0.1+0.5}\right) \times 0.1 \times \text{size\_1}\right) + \qquad (a)$$
$$(100 \times 0.05 \times \text{size\_1} \times \text{size\_1}) \Rightarrow 5 \times (\text{size\_1}) + 5 \times (\text{size\_1})^2$$

For $\alpha=2$ (advertiser_2):
For $\lambda=1$ (first feature value), $\gamma=2$ (refers to advertiser_2):

$$(\text{weight\_1} \times \text{Feature\_val\_1} \times \text{size\_2}) + 3 \qquad (1)$$

For $\lambda=2$ (second feature value):

$$(\text{weight\_2} \times \text{Feature\_val\_2} \times \text{size\_2}) \qquad (2)$$

$$(1) + (2) \Rightarrow \qquad (b)$$
$$\left(\left(\frac{30}{0.3+0.5}\right) \times 0.3 \times \text{size\_2}\right) + (100 \times 0.03 \times \text{size\_2} \times \text{size\_2}) + 3 \Rightarrow$$
$$11.25 \times (\text{size\_2}) + 3 \times (\text{size\_2})^2 + 3$$

For $\alpha=3$ (advertiser_3):
For $\lambda=1$ (first feature value), $\gamma=3$ (refers to advertiser_3):

$$(\text{weight\_1} \times \text{Feature\_val\_1} \times \text{size\_3}) + 4 \qquad (1)$$

For $\lambda=2$ (second feature value):

$$(\text{weight\_2} \times \text{Feature\_val\_2} \times \text{size\_3}) \qquad (2)$$

$$(1) + (2) \Rightarrow \qquad (c)$$
$$\left(\left(\frac{30}{0.9+0.5}\right) \times 0.9 \times \text{size\_3}\right) + (100 \times 0.06 \times \text{size\_3} \times \text{size\_3}) + 4 \Rightarrow$$
$$19.29 \times (\text{size\_3}) + 6 \times (\text{size\_3})^2 + 4$$

Summing parts (a)+(b)+(c) provides:

$$5 \times (\text{size\_1}) + 5 \times (\text{size\_1})^2 + 11.25 \times (\text{size\_2}) + 3 \times (\text{size\_2})^2 +$$
$$3 + 19.29 \times (\text{size\_3}) + 6 \times (\text{size\_3})^2 + 4 \Rightarrow$$

Substituting the size values for this orientation and layout provides:
value=20.40
$2^{ND}$ Layout (FIG. 7):
first orientation of ads
For $$\left.\begin{array}{l}\text{size\_1} = \frac{1}{2}\\ \text{size\_2} = \frac{1}{4}\\ \text{size\_3} = \frac{1}{4}\end{array}\right\},$$

entering these values in the optimization function generates:
According to equation $$\sum_\alpha \sum_\lambda (\text{weight}\_\lambda \times \text{Feature\_val}\_\lambda \times \text{size}\_\alpha) + \sum_\gamma (\text{reward}\_\gamma) \qquad 5$$

For $\alpha=1$ (advertiser_1):
For $\lambda=1$ (first feature value), $\gamma=1$ (refers to advertiser_1):

$$(\text{weight}\_1 \times \text{Feature\_val}\_1 \times \text{size}\_1) + 5 \qquad (1)$$

For $\lambda=2$ (second feature value):

$$(\text{weight}\_2 \times \text{Feature\_val}\_2 \times \text{size}\_1) \qquad (2)$$

$(1) + (2) \Rightarrow$ (a)

$$\left(\left(\frac{30}{0.1+0.5}\right) \times 0.1 \times \text{size}\_1\right) + (100 \times 0.05 \times \text{size}\_1 \times \text{size}\_1) + 5 \Rightarrow$$
$$5 \times (\text{size}\_1) + 5 \times (\text{size}\_1)^2 + 5$$

For $\alpha=2$ (advertiser_2):
For $\lambda=1$ (first feature value), $\gamma=2$ (refers to advertiser_2):

$$(\text{weight}\_1 \times \text{Feature\_val}\_1 \times \text{size}\_2) + 3 \qquad (1)$$

For $\lambda=2$ (second feature value):

$$(\text{weight}\_2 \times \text{Feature\_val}\_2 \times \text{size}\_2) \qquad (2)$$

$(1) + (2) \Rightarrow$ (b)

$$\left(\left(\frac{30}{0.3+0.5}\right) \times 0.3 \times \text{size}\_2\right) + (100 \times 0.03 \times \text{size}\_2 \times \text{size}\_2) + 3 \Rightarrow$$
$$11.25 \times (\text{size}\_2) + 3 \times (\text{size}\_2)^2 + 3$$

For $\lambda=3$ (advertiser_3):
For $\lambda=1$ (first feature value), $\gamma=3$ (refers to advertiser_3):

$$(\text{weight}\_1 \times \text{Feature\_val}\_1 \times \text{size}\_3) \qquad (1)$$

For $\lambda=2$ (second feature value):

$$(\text{weight}\_2 \times \text{Feature\_val}\_2 \times \text{size}\_3) \qquad (2)$$

$(1) + (2) \Rightarrow$ (c)

$$\left(\left(\frac{30}{0.9+0.5}\right) \times 0.9 \times \text{size}\_3\right) + (100 \times 0.06 \times \text{size}\_3 \times \text{size}\_3) \Rightarrow$$
$$19.29 \times (\text{size}\_3) + 6 \times (\text{size}\_3)^2$$

Summing parts (a)+(b)+(c) provides:

$$5 \times (\text{size}\_1) + 5 \times (\text{size}\_1)^2 + 5 + 11.25 \times (\text{size}\_2) + 3 \times (\text{size}\_2)^2 + 3 + 19.29 \times (\text{size}\_3) + 6 \times (\text{size}\_3)^2 \Rightarrow$$

Substituting the size values for this orientation and layout provides:
value=19.95
second orientation of ads
For $$\left. \begin{array}{l} \text{size}\_1 = \frac{1}{4} \\ \text{size}\_2 = \frac{1}{2} \\ \text{size}\_3 = \frac{1}{4} \end{array} \right\},$$

entering these values in the optimization function generates:
According to equation $$\sum_\alpha \sum_\lambda (\text{weight}\_\lambda \times \text{Feature\_val}\_\lambda \times \text{size}\_\alpha) + \sum_\gamma (\text{reward}\_\gamma)$$

For $\alpha=1$ (advertiser_1):
For $\lambda=1$ (first feature value), $\gamma=1$ (refers to advertiser_1):

$$(\text{weight}\_1 \times \text{Feature\_val}\_1 \times \text{size}\_1) \qquad (1)$$

For $\lambda=2$ (second feature value):

$$(\text{weight}\_2 \times \text{Feature\_val}\_2 \times \text{size}\_1) \qquad (2)$$

$(1) + (2) \Rightarrow \left(\left(\frac{30}{0.1+0.5}\right) \times 0.1 \times \text{size}\_1\right) +$ (a)
$$(100 \times 0.05 \times \text{size}\_1 \times \text{size}\_1) \Rightarrow 5 \times (\text{size}\_1) + 5 \times (\text{size}\_1)^2$$

For $\alpha=2$ (advertiser_2):
For $\lambda=1$ (first feature value), $\gamma=2$ (refers to advertiser_2):

$$(\text{weight}\_1 \times \text{Feature\_val}\_1 \times \text{size}\_2) + 3 \qquad (1)$$

For $\lambda=2$ (second feature value):

$$(\text{weight}\_2 \times \text{Feature\_val}\_2 \times \text{size}\_2) \qquad (2)$$

$(1) + (2) \Rightarrow$ (b)

$$\left(\left(\frac{30}{0.3+0.5}\right) \times 0.3 \times \text{size}\_2\right) + (100 \times 0.03 \times \text{size}\_2 \times \text{size}\_2) + 3 \Rightarrow$$
$$11.25 \times (\text{size}\_2) + 3 \times (\text{size}\_2)^2 + 3$$

For $\alpha=3$ (advertiser_3):
For $\lambda=1$ (first feature value), $\gamma=3$ (refers to advertiser_3):

$$(\text{weight}\_1 \times \text{Feature\_val}\_1 \times \text{size}\_3) \qquad (1)$$

For $\lambda=2$ (second feature value):

$$(\text{weight}\_2 \times \text{Feature\_val}\_2 \times \text{size}\_3) \qquad (2)$$

$(1) + (2) \Rightarrow$ (c)

$$\left(\left(\frac{30}{0.9+0.5}\right) \times 0.9 \times \text{size}\_3\right) + (100 \times 0.06 \times \text{size}\_3 \times \text{size}\_3) \Rightarrow$$
$$19.29 \times (\text{size}\_3) + 6 \times (\text{size}\_3)^2$$

Summing parts (a)+(b)+(c) provides:

$$5 \times (\text{size}\_1) + 5 \times (\text{size}\_1)^2 + 11.25 \times (\text{size}\_2) + 3 \times (\text{size}\_2)^2 + 3 + 19.29 \times (\text{size}\_3) + 6 \times (\text{size}\_3)^2 \Rightarrow$$

Substituting the size values for this orientation and layout provides:
value=1614
third orientation of ads
For $$\left. \begin{array}{l} \text{size}\_1 = \frac{1}{4} \\ \text{size}\_2 = \frac{1}{4} \\ \text{size}\_3 = \frac{1}{2} \end{array} \right\},$$

entering these values in the optimization function generates:
According to equation $$\sum_\alpha \sum_\lambda (\text{weight\_}\lambda \times \text{Feature\_val\_}\lambda \times \text{size\_}\alpha) + \sum_\gamma (\text{reward\_}\gamma) \quad (5)$$

For α=1 (advertiser_1):
For λ=1 (first feature value), γ=1 (refers to advertiser_1):
$$(\text{weight\_1} \times \text{Feature\_val\_1} \times \text{size\_1}) \quad (1)$$
For λ=2 (second feature value):

$$(\text{weight\_2} \times \text{Feature\_val\_2} \times \text{size\_1}) \quad (2)$$

$$(1)+(2) \Rightarrow \left(\left(\frac{30}{0.1+0.5}\right) \times 0.1 \times \text{size\_1}\right) + \quad (a)$$
$$(100 \times 0.05 \times \text{size\_1} \times \text{size\_1}) \Rightarrow 5 \times (\text{size\_1}) + 5 \times (\text{size\_1})^2$$

For α=2 (advertiser_2):
For λ=1 (first feature value), γ=2 (refers to advertiser_2):
$$(\text{weight\_1} \times \text{Feature\_val\_1} \times \text{size\_2})+3 \quad (1)$$
For λ=2 (second feature value):

$$(\text{weight\_2} \times \text{Feature\_val\_2} \times \text{size\_2}) \quad (2)$$

$$(1)+(2) \Rightarrow \quad (b)$$
$$\left(\left(\frac{30}{0.3+0.5}\right) \times 0.3 \times \text{size\_2}\right) + (100 \times 0.03 \times \text{size\_2} \times \text{size\_2}) + 3 \Rightarrow$$
$$11.25 \times (\text{size\_2}) + 3 \times (\text{size\_2})^2 + 3$$

For α=3 (advertiser_3):
For λ=1 (first feature value), γ=3 (refers to advertiser_3):
$$(\text{weight\_1} \times \text{Feature\_val\_1} \times \text{size\_3})+4 \quad (1)$$
For λ=2 (second feature value):

$$(\text{weight\_2} \times \text{Feature\_val\_2} \times \text{size\_3}) \quad (2)$$

$$(1)+(2) \Rightarrow \quad (c)$$
$$\left(\left(\frac{30}{0.9+0.5}\right) \times 0.9 \times \text{size\_3}\right) + (100 \times 0.06 \times \text{size\_3} \times \text{size\_3}) + 4 \Rightarrow$$
$$19.29 \times (\text{size\_3}) + 6 \times (\text{size\_3})^2 + 4$$

Summing parts (a)+(b)+(c) provides:
$$5\times(\text{size\_1})+5\times(\text{size\_1})^2+11.25\times(\text{size\_2})+3\times(\text{size\_2})^2+$$
$$3+19.29\times(\text{size\_3})+6\times(\text{size\_3})^2+4 \Rightarrow$$

Substituting the size values for this orientation and layout provides:
value=22.71
3$^{RD}$ Layout (FIG. 8):
first orientation of ads
For $$\left.\begin{array}{l}\text{size\_1} = \frac{2}{3}\\ \text{size\_2} = \frac{1}{6}\\ \text{size\_3} = \frac{1}{6}\end{array}\right\},$$

entering these values in the optimization function generates:
According to equation $$\sum_\alpha \sum_\lambda (\text{weight\_}\lambda \times \text{Feature\_val\_}\lambda \times \text{size\_}\alpha) + \sum_\gamma (\text{reward\_}\gamma) \quad (5)$$

For α=1 (advertiser_1):
For λ=1 (first feature value), γ=1 (refers to advertiser_1):
$$(\text{weight\_1} \times \text{Feature\_val\_1} \times \text{size\_1})+5 \quad (1)$$
For λ=2 (second feature value):

$$(\text{weight\_2} \times \text{Feature\_val\_2} \times \text{size\_1}) \quad (2)$$

$$(1)+(2) \Rightarrow \quad (a)$$
$$\left(\left(\frac{30}{0.1+0.5}\right) \times 0.1 \times \text{size\_1}\right) + (100 \times 0.05 \times \text{size\_1} \times \text{size\_1}) + 5 \Rightarrow$$
$$5 \times (\text{size\_1}) + 5 \times (\text{size\_1})^2 + 5$$

For α=2 (advertiser_2):
For λ=1 (first feature value), γ=2 (refers to advertiser_2):
$$(\text{weight\_1} \times \text{Feature\_val\_1} \times \text{size\_2}) \quad (1)$$
For λ=2 (second feature value):

$$(\text{weight\_2} \times \text{Feature\_val\_2} \times \text{size\_2}) \quad (2)$$

$$(1)+(2) \Rightarrow \quad (b)$$
$$\left(\left(\frac{30}{0.3+0.5}\right) \times 0.3 \times \text{size\_2}\right) + (100 \times 0.03 \times \text{size\_2} \times \text{size\_2}) \Rightarrow$$
$$11.25 \times (\text{size\_2}) + 3 \times (\text{size\_2})^2$$

For α=3 (advertiser_3):
For λ=1 (first feature value), γ=3 (refers to advertiser_3):
$$(\text{weight\_1} \times \text{Feature\_val\_1} \times \text{size\_3}) \quad (1)$$
For λ=2 (second feature value):

$$(\text{weight\_2} \times \text{Feature\_val\_2} \times \text{size\_3}) \quad (2)$$

$$(1)+(2) \Rightarrow \quad (c)$$
$$\left(\left(\frac{30}{0.9+0.5}\right) \times 0.9 \times \text{size\_3}\right) + (100 \times 0.06 \times \text{size\_3} \times \text{size\_3}) \Rightarrow$$
$$19.29 \times (\text{size\_3}) + 6 \times (\text{size\_3})^2$$

Summing parts (a)+(b)+(c) provides:
$$5\times(\text{size\_1})+5\times(\text{size\_1})^2+5+11.25\times(\text{size\_2})+3\times$$
$$(\text{size\_2})^2+19.29\times(\text{size\_3})+6\times(\text{size\_3})^2 \Rightarrow$$

Substituting the size values for this orientation and layout provides:
value=15.90
second orientation of ads
For $$\left.\begin{array}{l}\text{size\_1} = \frac{1}{6}\\ \text{size\_2} = \frac{2}{3}\\ \text{size\_3} = \frac{1}{6}\end{array}\right\},$$

entering these values in the optimization function generates:
According to equation $$\sum_\alpha \sum_\lambda (\text{weight\_}\lambda \times \text{Feature\_val\_}\lambda \times \text{size\_}\alpha) + \sum_\gamma (\text{reward\_}\gamma) \quad (5)$$

For α=1 (advertiser_1):
For λ=1 (first feature value), γ=1 (refers to advertiser_1):

$$(\text{weight\_1} \times \text{Feature\_val\_1} \times \text{size\_1}) \quad (1)$$

For λ=2 (second feature value):

$$(\text{weight\_2} \times \text{Feature\_val\_2} \times \text{size\_1}) \quad (2)$$

$$(1) + (2) \Rightarrow \left(\left(\frac{30}{0.1+0.5}\right) \times 0.1 \times \text{size\_1}\right) + \quad (a)$$
$$(100 \times 0.05 \times \text{size\_1} \times \text{size\_1}) \Rightarrow 5 \times (\text{size\_1}) + 5 \times (\text{size\_1})^2$$

For α=2 (advertiser_2):
For λ=1 (first feature value), γ=2 (refers to advertiser_2):

$$(\text{weight\_1} \times \text{Feature\_val\_1} \times \text{size\_2}) + 3 \quad (1)$$

For λ=2 (second feature value):

$$(\text{weight\_2} \times \text{Feature\_val\_2} \times \text{size\_2}) \quad (2)$$

$$(1) + (2) \Rightarrow \quad (b)$$
$$\left(\left(\frac{30}{0.3+0.5}\right) \times 0.3 \times \text{size\_2}\right) + (100 \times 0.03 \times \text{size\_2} \times \text{size\_2}) + 3 \Rightarrow$$
$$11.25 \times (\text{size\_2}) + 3 \times (\text{size\_2})^2 + 3$$

For α=3 (advertiser_3):
For λ=1 (first feature value), γ=3 (refers to advertiser_3):

$$(\text{weight\_1} \times \text{Feature\_val\_1} \times \text{size\_3}) \quad (1)$$

For λ=2 (second feature value):

$$(\text{weight\_2} \times \text{Feature\_val\_2} \times \text{size\_3}) \quad (2)$$

$$(1) + (2) \Rightarrow \quad (c)$$
$$\left(\left(\frac{30}{0.9+0.5}\right) \times 0.9 \times \text{size\_3}\right) + (100 \times 0.06 \times \text{size\_3} \times \text{size\_3}) \Rightarrow$$
$$19.29 \times (\text{size\_3}) + 6 \times (\text{size\_3})^2$$

Summing parts (a)+(b)+(c) provides:

$$5 \times (\text{size\_1}) + 5 \times (\text{size\_1})^2 + 11.25 \times (\text{size\_2}) + 3 \times (\text{size\_2})^2 +$$
$$3 + 19.29 \times (\text{size\_3}) + 6 \times (\text{size\_3})^2 \Rightarrow$$

Substituting the size values for this orientation and layout provides:
  value=16.19
  third orientation of ads
For $$\left.\begin{array}{l} \text{size\_1} = \frac{1}{6} \\ \text{size\_2} = \frac{1}{6} \\ \text{size\_3} = \frac{2}{3} \end{array}\right\},$$

entering these values in the optimization function generates:
According to equation $$\sum_\alpha \sum_\lambda (\text{weight\_}\lambda \times \text{Feature\_val\_}\lambda \times \text{size\_}\alpha) + \sum_\gamma (\text{reward\_}\gamma) \quad (5)$$

For α=1 (advertiser_1):
For λ=1 (first feature value), γ=1 (refers to advertiser_1):

$$(\text{weight\_1} \times \text{Feature\_val\_1} \times \text{size\_1}) \quad (1)$$

For λ=2 (second feature value):

$$(\text{weight\_2} \times \text{Feature\_val\_2} \times \text{size\_1}) \quad (2)$$

$$(1) + (2) \Rightarrow \left(\left(\frac{30}{0.1+0.5}\right) \times 0.1 \times \text{size\_1}\right) + \quad (a)$$
$$(100 \times 0.05 \times \text{size\_1} \times \text{size\_1}) \Rightarrow 5 \times (\text{size\_1}) + 5 \times (\text{size\_1})^2$$

For α=2 (advertiser_2):
For λ=1 (first feature value), γ=2 (refers to advertiser_2):

$$(\text{weight\_1} \times \text{Feature\_val\_1} \times \text{size\_2}) \quad (1)$$

For λ=2 (second feature value):

$$(\text{weight\_2} \times \text{Feature\_val\_2} \times \text{size\_2}) \quad (2)$$

$$(1) + (2) \Rightarrow \quad (b)$$
$$\left(\left(\frac{30}{0.3+0.5}\right) \times 0.3 \times \text{size\_2}\right) + (100 \times 0.03 \times \text{size\_2} \times \text{size\_2}) \Rightarrow$$
$$11.25 \times (\text{size\_2}) + 3 \times (\text{size\_2})^2$$

For α=3 (advertiser_3):
For λ=1 (first feature value), γ=3 (refers to advertiser_3):

$$(\text{weight\_1} \times \text{Feature\_val\_1} \times \text{size\_3}) + 4 \quad (1)$$

For λ=2 (second feature value):

$$(\text{weight\_2} \times \text{Feature\_val\_2} \times \text{size\_3}) \quad (2)$$

$$(1) + (2) \Rightarrow \quad (c)$$
$$\left(\left(\frac{30}{0.9+0.5}\right) \times 0.9 \times \text{size\_3}\right) + (100 \times 0.06 \times \text{size\_3} \times \text{size\_3}) + 4 \Rightarrow$$
$$19.29 \times (\text{size\_3}) + 6 \times (\text{size\_3})^2 + 4$$

Summing parts (a)+(b)+(c) provides:

$$5 \times (\text{size\_1}) + 5 \times (\text{size\_1})^2 + 11.25 \times (\text{size\_2}) + 3 \times (\text{size\_2})^2 +$$
$$19.29 \times (\text{size\_3}) + 6 \times (\text{size\_3})^2 + 4 \Rightarrow$$

Substituting the size values for this orientation and layout provides:
  value=22.46
  As can be concluded by looking at the generated values in each layout, the optimum configuration is achieved by choosing the second layout (FIG. 7) with the third orientation of ads. which gives value=22.71.
  In this configuration advertiser_1 gets an ad space value of two thirds of the total layout space, advertiser_2 gets an ad space value of one sixth of the total layout space, and advertiser_3 gets an ad space of one sixth of the total layout space.

§ 4.5 CONCLUSION

As can be appreciated from the foregoing, the present invention can be used to improve ads by optimizing the size and/or layout of a set of ads.

What is claimed is:

1. A computer-implemented method, comprising:
receiving, by one or more computers and for each content item of a plurality of content items, content item data representing characteristics of the content item;
for each candidate layout of a plurality of candidate layouts,
receiving, by the one or more computers and for the candidate layout, constraint data specifying a number of content items permitted to be presented in the candidate layout and available space for presenting each content item in the candidate layout;
selecting, by the one or more computers and for each content item in a combination of the content items that are presentable in the available space, rendering parameters for the content item based on the content item data and the constraint data;
computing, by the one or more computers and for each content item in the combination of content items, a weight value for one of the characteristics of the content item; and
computing, by the one or more computers and for the candidate layout, a result value based on a function of the weight value and the data representing the one of the characteristics;
selecting, by the one or more computers, a first candidate layout of the plurality of candidate layouts as a presentation layout based on the result value for the first candidate layout being higher than result values for other candidate layouts of the plurality of candidate layouts, and
providing, by the one or more computers, the combination of content items for presentation in the presentation layout.

2. The method of claim 1, wherein:
receiving content item data comprises receiving, for at least one content item, content item data specifying a characteristic having a value that depends on a presentation style of the at least one content item relative to at least one other presentation style of at least one other content item; and
computing a weight value for one of the characteristics of the content item comprises computing the weight value for the characteristic having the value that depends on the presentation style.

3. The method of claim 1, wherein:
receiving content item data comprises receiving, for at least one content item, content item data specifying a characteristic having a value that depends on a respective candidate layout; and
computing a weight value for one of the characteristics of the content item comprises computing the weight value for the characteristic having the value that depends on the respective candidate layout.

4. The method of claim 1, wherein:
receiving content item data comprises receiving, for at least one content item, content item data specifying a characteristic having a value that depends on a presentation size of the at least one content item relative to at least one other presentation size of at least one other content item; and
computing a weight value for one of the characteristics of the content item comprises computing the weight value for the characteristic having the value that depends on the presentation size.

5. The method of claim 1, wherein:
receiving content item data comprises receiving, for at least one content item, content item data specifying a characteristic having a value that depends on a distance of a location associated with the content item request from a location associated with the content item; and
computing a weight value for one of the characteristics of the content item comprises computing the weight value for the characteristic having the value that depends on the distance.

6. A non-transitory computer readable medium storing instructions that when executed by one or more computers cause the one or more computers to perform operations comprising:
receiving, for each content item of a plurality of content items, content item data representing characteristics of the content item;
for each candidate layout of a plurality of candidate layouts,
receiving, for the candidate layout, constraint data specifying a number of content item permitted to be presented in the candidate layout and available space for presenting each content item in the candidate layout;
selecting, for each content item in a combination of the content items that are presentable in the available space, rendering parameters for the content item based on the content item data and the constraint data;
computing, for each content item in the combination of content item, a weight value for one of the characteristics of the content item; and
computing, for the candidate layout, a result value based on a function of the weight value and the data representing the one of the characteristics;
selecting a first candidate layout of the plurality of candidate layouts as a presentation layout based on the result value for the first candidate layout being higher than result values for other candidate layouts of the plurality of candidate layouts; and
providing the combination of content items for presentation in the presentation layout.

7. The computer readable medium of claim 6, wherein:
receiving content item data comprises receiving, for at least one content item, content item data specifying a characteristic having a value that depends on a presentation style of the at least one content item relative to at least one other presentation style of at least one other content item; and
computing a weight value for one of the characteristics of the content item comprises computing the weight value for the characteristic having the value that depends on the presentation style.

8. The computer readable medium of claim 6, wherein:
receiving content item data comprises receiving, for at least one content item, content item data specifying a characteristic having a value that depends on a respective candidate layout; and
computing a weight value for one of the characteristics of the content item comprises computing the weight value for the characteristic having the value that depends on the respective candidate layout.

9. The computer readable medium of claim 6, wherein:
receiving content item data comprises receiving, for at least one content item, content item data specifying a characteristic having a value that depends on a presentation size of the at least one content item relative to at least one other presentation size of at least one other content item; and
computing a weight value for one of the characteristics of the content item comprises computing the weight value for the characteristic having the value that depends on the presentation size.

10. The computer readable medium of claim 6, wherein:
receiving content item data comprises receiving, for at least one content item, content item data specifying a characteristic having a value that depends on a distance of a location associated with the content item request from a location associated with the content item; and
computing a weight value for one of the characteristics of the content item comprises computing the weight value for the characteristic having the value that depends on the distance.

11. A system, comprising:
a storage device storing advertisement data representing characteristics of a plurality of advertisements; and
one or more computers that interact with the data storage device and execute instructions that cause the one or more computers:
receive, for each content item of a plurality of content items, content item data representing characteristics of the content item;
for each candidate layout of a plurality of candidate layouts,
  receive, for the candidate layout, constraint data specifying a number of content items permitted to be presented in the candidate layout and available space for presenting each content item in the candidate layout;
  select, for each content item in a combination of the content items that are presentable in the available space, rendering parameters for the content item based on the content item data and the constraint data;
  compute, for each content item in the combination of content items, a weight value for one of the characteristics of the content item; and
compute, for the candidate layout, a result value based on a function of the weight value and the data representing the one of the characteristics;
select a first candidate layout of the plurality of candidate layouts as a presentation layout based on the result value for the first candidate layout being higher than result values for other candidate layouts of the plurality of candidate layouts; and
provide the combination of content items for presentation in the presentation layout.

12. The system of claim 11, wherein:
receiving content item data comprises receiving, for at least one content item, content item data specifying a characteristic having a value that depends on a presentation style of the at least one content item relative to at least one other presentation style of at least one other content item; and
computing a weight value for one of the characteristics of the content item comprises computing the weight value for the characteristic having the value that depends on the presentation style.

13. The system of claim 11, wherein:
receiving content item semen data comprises receiving, for at least one content item, content item data specifying a characteristic having a value that depends on a respective candidate layout; and
computing a weight value for one of the characteristics of the content item comprises computing the weight value for the characteristic having the value that depends on the respective candidate layout.

14. The system of claim 11, wherein:
receiving content item data comprises receiving, for at least one content item, content item data specifying a characteristic having a value that depends on a presentation size of the at least one content item relative to at least one other presentation size of at least one other content item; and
computing a weight value for one of the characteristics of the content item comprises computing the weight value for the characteristic having the value that depends on the presentation size.

15. The system of claim 11, wherein:
receiving content item data comprises receiving, for at least one content item, content item data specifying a characteristic having a value that depends on a distance of a location associated with the content item request from a location associated with the content item; and
computing a weight value for one of the characteristics of the content item comprises computing the weight value for the characteristic having the value that depends on the distance.

* * * * *